United States Patent
Thomas et al.

(10) Patent No.: US 12,136,414 B2
(45) Date of Patent: Nov. 5, 2024

(54) INTEGRATING DIALOG HISTORY INTO END-TO-END SPOKEN LANGUAGE UNDERSTANDING SYSTEMS

(71) Applicant: International Business Machines Corporation, Armonk, NY (US)

(72) Inventors: Samuel Thomas, White Plains, NY (US); Jatin Ganhotra, White Plains, NY (US); Hong-Kwang Kuo, Pleasantville, NY (US); Sachindra Joshi, Gurgaon (IN); George Andrei Saon, Stamford, CT (US); Zoltan Tueske, White Plains, NY (US); Brian E. D. Kingsbury, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 17/405,532

(22) Filed: Aug. 18, 2021

(65) Prior Publication Data
US 2023/0056680 A1    Feb. 23, 2023

(51) Int. Cl.
*G10L 15/16*    (2006.01)
*G10L 15/065*    (2013.01)
(Continued)

(52) U.S. Cl.
CPC ............ *G10L 15/16* (2013.01); *G10L 15/065* (2013.01); *G10L 15/1815* (2013.01); *G10L 15/183* (2013.01); *G10L 2015/088* (2013.01)

(58) Field of Classification Search
CPC ......... G10L 15/16; G10L 15/20; G10L 15/22; G10L 15/26; G10L 15/065;
(Continued)

(56) References Cited

U.S. PATENT DOCUMENTS 11,107,462 B1 *  8/2021  Fuegen .................. G10L 15/22
11,393,456 B1 *  7/2022  Guo ...................... G10L 15/063
(Continued)

FOREIGN PATENT DOCUMENTS

CN         110413752 A        11/2019
CN         112182191 A         1/2021
WO    WO-2020051192 A1 *      3/2020   ............ G06F 40/117

OTHER PUBLICATIONS

Yao Qian, Rutuja Ubale, Vikram Ramanaryanan, Patrick Lange, David Suendermann-Oeft, Keelan Evanini, and Eugene Tsuprun, Exploring ASR-Free End-To-End Modeling To Improve Spoken Language Understanding in a Cloud-Based Dialog System, IEEE, 2017, pp. 569-576 (Year: 2017).*
(Continued)

*Primary Examiner* — Richemond Dorvil
*Assistant Examiner* — Nadira Sultana
(74) *Attorney, Agent, or Firm* — Scully, Scott, Murphy & Presser, P.C.; Caleb Wilkes

(57) ABSTRACT

Audio signals representing a current utterance in a conversation and a dialog history including at least information associated with past utterances corresponding to the current utterance in the conversation can be received. The dialog history can be encoded into an embedding. A spoken language understanding neural network model can be trained to perform a spoken language understanding task based on input features including at least speech features associated with the received audio signals and the embedding. An encoder can also be trained to encode a given dialog history into an embedding. The spoken language understanding task can include predicting a dialog action of an utterance. The spoken language understanding task can include predicting a dialog intent or overall topic of the conversation.

20 Claims, 6 Drawing Sheets

(51) Int. Cl.
  *G10L 15/18* (2013.01)
  *G10L 15/183* (2013.01)
  *G10L 15/08* (2006.01)
(58) Field of Classification Search
  CPC ........... G10L 2015/088; G10L 15/1815; G10L 15/183; G06N 3/044; G06N 3/088; G06F 40/30
  See application file for complete search history.

(56) References Cited

U.S. PATENT DOCUMENTS

| | | | | |
|---|---|---|---|---|
| 11,568,145 | B1* | 1/2023 | Romeo | G06F 40/30 |
| 11,783,812 | B2* | 10/2023 | Irsoy | G10L 15/28 704/235 |
| 11,929,062 | B2* | 3/2024 | Kuo | G06N 3/044 |
| 2017/0372200 | A1* | 12/2017 | Chen | G06N 3/044 |
| 2021/0082412 | A1* | 3/2021 | Kennewick | G10L 13/08 |
| 2021/0217408 | A1* | 7/2021 | Hakkani-Tur | G06F 40/284 |
| 2021/0375272 | A1* | 12/2021 | Madwed | G06F 3/167 |
| 2022/0093101 | A1* | 3/2022 | Krishnan | G10L 15/24 |

OTHER PUBLICATIONS

Natalia Tomashenko, Christian Raymond, Antoine Caubri'ere, Renato De Mori, Yannick Est'eve, Dialogue History Integration Into End-To-End Signal-To-Concept Spoken Language Understanding Systems, IEEE, 2020, pp. 8509-8513 (Year: 2020).*
Tomashenko, N., et al., "Dialogue history integration into end-to-end signal-to-concept spoken language understanding systems", https://arxiv.org/abs/2002.06012v1, arXiv:2002.06012v1, Feb. 14, 2020, 5 pages.
Dang, V.-T., et al., "End-to-end speech-to-dialog-act recognition", https://arxiv.org/abs/2004.11419v2, arXiv:2004.11419v2, Jul. 28, 2020, 5 pages.
Rao, M., et al., "Do as I mean, not as I say: Sequence Loss Training for Spoken Language Understanding", https://arxiv.org/abs/2102.06750v1, arXiv:2102.06750v1, Feb. 12, 2021, 5 pages.
Rao, M., et al., "Speech To Semantics: Improve ASR and NLU Jointly via All-Neural Interfaces", https://arxiv.org/abs/2008.06173v1, arXiv:2008.06173v1, Aug. 14, 2020, 5 pages.
Luan, Y., et al., "Efficient learning for spoken language understanding tasks with word embedding based pre-training", https://www.isca-speech.org/archive/interspeech_2015/papers/i15_1398.pdf, Interspeech 2015, Sep. 2015, 7 pages.
Chao, G.-L., et al., "BERT-DST: Scalable End-to-End Dialogue State Tracking with Bidirectional Encoder Representations from Transformer", https://arxiv.org/abs/1907.03040v1, arXiv:1907.03040v1, Jul. 5, 2019, 5 pages.
Liu, C., et al., "Jointly Encoding Word Confusion Network and Dialogue Context with BERT for Spoken Language Understanding", https://arxiv.org/pdf/2005.11640v3.pd, arXiv:2005.11640v3, Sep. 8, 2020, 5 pages.
NIST, "NIST Cloud Computing Program", http://csrc.nist.gov/groups/SNS/cloud-computing/index.html, Created Dec. 1, 2016, Updated Oct. 6, 2017, 9 pages.
Chen, Y.-N., et al., "End-to-End Memory Networks with Knowledge Carryover for Multi-Turn Spoken Language Understanding", The 17th Annual Meeting of the International Speech Communication Association (INTERSPEECH 2016), Sep. 30, 2016, 3 pages.
International Search Report and Written Opinion dated Oct. 26, 2022 issued in PCT/CN2022/109068, 9 pages.
Goel, V., et al., "Language Model Estimation for Optimizing End-to-end Performance of a Natural Language Call Routing System", ICASSP 2005, Feb. 2005, pp. 565-568.
Haghani, P., et al., "From audio to semantics: Approaches to end-to-end spoken language under-standing", arXiv:1809.09190v1, Sep. 24, 2018, 7 pages.
Serdyuk, Y., et al., "Towards end-to-end spoken language understanding", arXiv:1802.08395v1, Feb. 23, 2018, 5 pages.
Qian, R., et al., "Exploring ASR-free end-to-end modeling to improve spoken language understanding in a cloud-based dialog system," 2017 IEEE Automatic Speech Recognition and Understanding Workshop (ASRU), Dec. 16-20, 2017 8 pages.
Chen, Y.-P., et al., "Spoken language under-standing without speech recognition", ICASSP 2018, Apr. 15, 2018, pp. 6189-6193.
Lugosch, L., et al., "Speech Model Pre-training for End-to-End Spoken Language Understanding", arXiv:1904.03670v2, Jul. 25, 2019, 5 pages.
Caubriere, A., et al., "Curriculum-based transfer Learning for an effective end-to-end spoken language understanding and domain portability", arXiv:1906.07601v1, Jun. 18, 2019, 5 pages.
Huang, Y,. et al., "Leveraging unpaired text data for training end-to-end speech-to-intent systems", arXiv:2010.04284v1, Oct. 8, 2020, 5 pages.
Price, R., et al., "Improved end-to-end spoken utterance classification with a self-attention acoustic classifier", ICASSP 2020, May 2020, pp. 8504-8508.
Radfar, M., et al., "End-to-end Neural Transformer Based Spoken Language Understanding," arXiv:2008.10984v1, Aug. 12, 2020, 5 pages.
Tian, Y., et al., "Improving end-to-end speech-to-intent classification with Reptile", INTERSPEECH 2020, Oct. 25-29, 2020, pp. 891-895.
Jia, X., et al., "Large-scale transfer learning for low-resource spoken language understanding", arXiv:2008.05671v1, Aug. 13, 2020, 5 pages.
Kuo, H.-K. J., et al., End-to-end spoken language understanding without full transcripts, arXiv:2009.14386v1, Sep. 30, 2020, 5 pages.
Palogiannidi, I., et al., "End-to-end architectures for ASR-free spoken language understanding", arXiv:1910.10599v3, May 1, 2020, 5 pages.
Bhargava, A., et al., "Easy contextual intent prediction and slot detection", 2013 IEEE International Conference on Acoustics, Speech and Signal Processing (ICASSP), Oct. 2013, 5 pages.
Xu, P., et al., "Contextual domain classification in spoken language understanding systems using recurrent neural network", 2014 IEEE International Conference on Acoustics, Speech and Signal Processing (ICASSP), May 4-9, 2014, 5 pages.
Chen, Y.-N., et al., "End-to-end Memory Networks with Knowledge Carryover for Multi-Turn Spoken Language Understanding", Proceedings of The 17th Annual Meeting of the International Speech Communication Association (INTERSPEECH 2016), Jun. 2016, 5 pages.
Sankar, C., et al., "Do Neural Dialog Systems Use the Conversation History Effectively?", arXiv:1906.01603v2, Jul. 25, 2019.
Goel, S., et al., "HyST: A Hybrid Approach for Flexible and Accurate Dialogue State Tracking", arXiv:1907.00883v1, Jul. 1, 2019, 5 pages.
Vukotic, V., et al., " A step beyond local observations with a dialog aware bidirectional GRU network for Spoken Language Understanding", Interspeech, 2016, Submitted on Aug. 4, 2016, 5 pages.
Henaff, M., et al., "Tracking the world state with recurrent entity networks," arXiv:1612.03969v3, May 10, 2017, 15 pages.
Korpusik, M., et al., "Dialogue state tracking with convolutional semantic taggers", The 44th IEEE International Conference on Acoustics, Speech and Signal Processing (ICASSP), May 2019, pp. 7220-7224.
Gupta, R., et al., "An Efficient Approach to Encoding Context for Spoken Language Understanding", arXiv:1807.00267v1, Jul. 1, 2018, 5 pages.
Qin, L., et al., "Knowing Where to Leverage: Context-Aware Graph Convolution Network with an Adaptive Fusion Layer for Contextual Spoken Language Understanding", IEEE/ACM Transactions on Audio, Speech and Language Processing, Manuscript received Aug. 26, 2020, revised Oct. 25, 2020, accepted Jan. 9, 2021, Date of publication Jan. 21, 2021, date of current version Apr. 8, 2021, pp. 1280-1289, vol. 29.

(56) References Cited

OTHER PUBLICATIONS

Tomashenko, N., et al., "Dialogue history integration into end-to-end signal-to-concept spoken language understanding systems," arXiv:2002.06012v1, Feb. 14, 2020, 5 pages.

Wu, M., et al., "HarperValleyBank: A Domain-Specific Spoken Dialog Corpus", arXiv:2010.13929v2, Mar. 19, 2021, 5 pages.

Devlin, J., et al., "Bert: Pre-training of Deep Bidirectional Transformers for Language Understanding," arXiv:1810.04805v2, May 24, 2019, 16 pages.

Thomas, S., et al., "RNN transducer models for spoken language understanding", arXiv:2104.03842v1, Apr. 8, 2021, 5 pages.

Saon, G., et al., "Advancing RNN transducer technology for speech recognition", arXiv:2103.09935v1, Mar. 17, 2021, 5 pages.

Saon, G., et al., "Speaker Adaptation of Neural Network acoustic models using i-vectors", 2013 IEEE Workshop on Automatic Speech Recognition and Understanding (ASRU), Dec. 2013, 5 pages.

He, Y., et al., "Stream-ing end-to-end speech recognition for mobile devices", arXiv:1811.06621v1, Nov. 15, 2018, 5 pages.

Rao, K., et al., "Exploring architectures, data and units for streaming end-to-end speech recognition with RNN-transducer", arXiv:1801.00841v1, Jan. 2, 2018, 7 pages.

Li, J., et al., "Improving RNN transducer modeling for end-to-end speech recognition", arXiv:1909.12415v1, Sep. 26, 2019, 8 pages.

El Shafey, L., et al., "Joint speech recognition and speaker diarization via sequence transduction", arXiv:1907.05337v1, Jul. 9, 2019, 5 pages.

Ghodsi, M., et al., "RNN-transducer with stateless prediction network", 2020 IEEE International Conference on Acoustics, Speech and Signal Processing (ICASSP), May 4-8, 2020, 5 pages.

Graves, A., et al., "Sequence Transduction with Recurrent Neural Networks," arXiv:1211.3711v1, Nov. 14, 2012, 9 pages.

Whang, T., et al., "An Effective Domain Adaptive Post-Training Method for BERT in Response Selection," arXiv:1908.04812v2, Jul. 27, 2020, 5 pages.

Gu, et al., "Speaker-aware bert for multi-turn response selection in retrieval-based chatbots", arXiv:2004.03588v2, Jul. 30, 2020, CIKM '20, Oct. 19-23, 2020, 7 pages.

Ko, T., et al., "Audio Augmentation for Speech Recognition", Interspeech 2015, Sep. 2015, 4 pages.

Audhkhasi, K., et al., Forget a bit to learn better: Soft forgetting for CTC-based auto-matic speech recognition, Interspeech 2019, Sep. 15-19, 2019, pp. 2618-2622.

Kurata, G., et al., "Guiding CTC posterior spike tim-ings for improved posterior fusion and knowledge distillation", arXiv:1904.08311v2, Jul. 2, 2019, 5 pages.

Smith, L.N., et al., "Super-convergence: Very fast train-ing of neural networks using large learning rates", arXiv:1708.07120v3, May 17, 2018, 18 pages.

* cited by examiner

INTEGRATING DIALOG HISTORY INTO END-TO-END SPOKEN LANGUAGE UNDERSTANDING SYSTEMS

BACKGROUND

The present application relates generally to computers and computer applications, and more particularly to natural language processing, automatic speech recognition, human-computer interaction, and integrating dialog history into a spoken language understanding system.

Conventional spoken language understanding (SLU) systems can be built by integrating a text-based natural language understanding system with an automatic speech recognition (ASR) system. Recently, these traditional systems have been replaced by end-to-end (E2E) systems that directly process speech to produce spoken language understanding (SLU) entity or intent label targets without any intermediate ASR processing. When processing human-human or human-computer interactions, these E2E SLU systems process each turn of a conversation independently.

However, spoken task-oriented conversations are often context dependent as users and agents converse in multiturn conversations to achieve the various user goals. These turns are also related, as the user or agent might refer to information introduced in previous turns. Without proper context these pieces of information introduce ambiguity. For example, "one" could refer to a scheduled appointment date or a part of a phone number or zip code depending on the context. Dialog history hence contains useful information that can be effectively used to improve the processing of each conversational turn and resolve such ambiguities in SLU systems.

BRIEF SUMMARY

The summary of the disclosure is given to aid understanding of a computer system and method of integrating dialog history into a spoken language understanding system, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A spoken language understanding system, in an aspect, can include at least one processor and at least one memory device coupled with at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding.

A spoken language understanding system, in another aspect, can include at least one processor and at least one memory device coupled with at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. The dialog history can include text, and at least one processor can be configured to encode the text into the embedding using a text encoder.

A spoken language understanding system, in yet another aspect, can include at least one processor and at least one memory device coupled with at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. The dialog history can include text, and at least one processor can be configured to encode the text into the embedding using a text encoder. The encoder is trained on application-specific data and task.

A spoken language understanding system, in still another aspect, can include at least one processor and at least one memory device coupled with at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. The dialog history can include audio signals, and at least one processor can be configured to encode the dialog history into the embedding directly from the audio signals.

A spoken language understanding system, in still yet another aspect, can include at least one processor and at least one memory device coupled with at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. At least some of the dialog history can include machine inferred information associated with the past utterances.

A spoken language understanding system, in another aspect, can include at least one processor and at least one memory device coupled with the at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. At least some of the dialog history can include output of the spoken language understanding neural network model from a previous turn in the conversation.

A spoken language understanding system, in an aspect, can include at least one processor and at least one memory device coupled with the at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. The spoken language understanding neural network model can include an end-to-end neural network accommodating spoken language understanding labels.

A spoken language understanding system, in an aspect, can include at least one processor and at least one memory device coupled with the at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. The spoken language understanding neural network model integrating the dialog history can be part of, and customizes, a speech-based spoken language understanding tool.

A spoken language understanding system, in an aspect, can include at least one processor and at least one memory device coupled with the at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. The spoken language understanding task can include predicting a dialog action associated with the current utterance.

A spoken language understanding system, in an aspect, can include at least one processor and at least one memory device coupled with the at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. The spoken language understanding task can include predicting a dialog intent associated with the conversation.

A spoken language understanding system, in an aspect, can include at least one processor and at least one memory device coupled with the at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. At least one processor can be configured to autonomously generate a next conversation utterance based on the spoken language understanding task output by the trained spoken language understanding neural network model.

A spoken language understanding system, in an aspect, can include at least one processor and at least one memory device coupled with the at least one processor. At least one processor can be configured to receive audio signals representing a current utterance in a conversation and a dialog history including at least information associated with past utterances corresponding to the current utterance in the conversation. At least one processor can also be configured to encode the dialog history into an embedding. At least one processor can also be configured to train a spoken language understanding neural network model to perform a spoken language understanding task based on input features. The input features can include speech features associated with the received audio signals and the embedding. At least one processor can be configured to autonomously generate a next conversation utterance based on the spoken language understanding task output by the trained spoken language understanding neural network model. At least one processor can be configured to further output as speech the generated next conversation utterance in conversing with a user.

A method for spoken language understanding, in an aspect, can include receiving audio signals representing a current utterance in a conversation and a dialog history including at least information associated with past utterances corresponding to the current utterance in the conversation. The method can also include encoding the dialog history into an embedding. The method can also include training a spoken language understanding neural network model to perform a spoken language understanding task based on input features. The input features can include speech features associated with the received audio signals and the embedding.

Additional embodiments and/or aspects of a method for spoken language understanding, for example, similarly to the different aspects of a system described above, and/or disclosed herein, can also be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Systems, methods and techniques can be provided, which encode dialog history (e.g., full dialog history) of a machine-to-human and/or human-to-human conversation into a speech based end-to-end (E2E) spoken language understanding (SLU) system.

Figure 1:
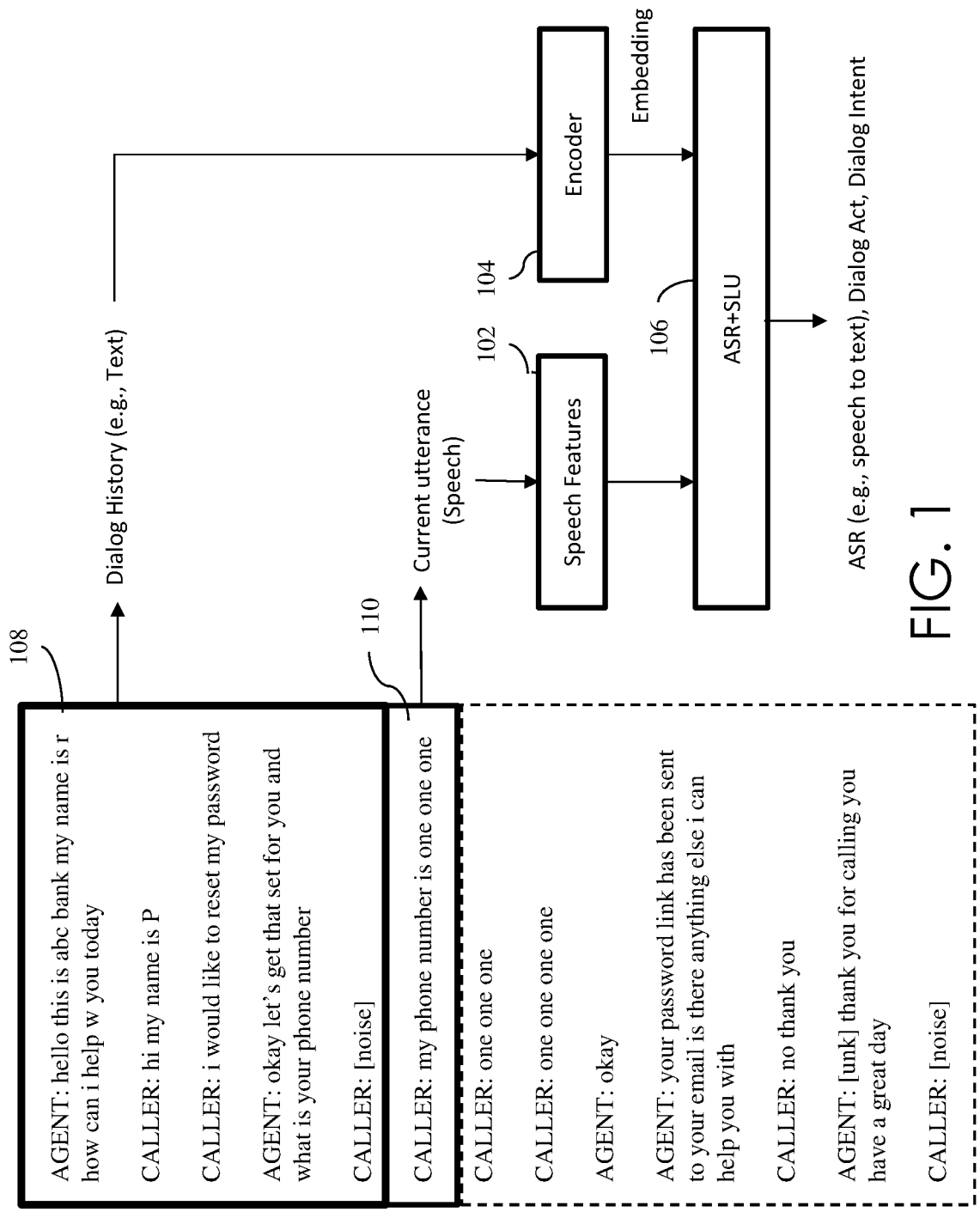
FIG. 1 is a diagram illustrating E2E SLU model or system architecture with dialog history in an embodiment.

FIG. 1 is a diagram illustrating E2E SLU model or system architecture with dialog history in an embodiment. The components of the system shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

The model shown in FIG. 1 can effectively encode full dialog history into a speech based E2E SLU system. A series of utterances in a conversation is shown with a current utterance 110, e.g., a current user response, being input as speech features 104. An encoder 104 encodes a dialog history (preceding utterances or turns in the conversation) 108 into an embedding. In an embodiment, a system and method disclosed herein can use Bidirectional Encoder Representations from Transformers (BERT) model embeddings to encode various elements of dialog history: e.g., the textual content of previous turns, speaker role (whether agent or user) for each turn and previous SLU tags for each utterance in the dialog history 108. Another encoder can be used for generating such embeddings.

These embeddings can then be used as features that contain side information on dialog history for an SLU system 106, for example, but not limited to, a recurrent neural network (RNN) Transducer based E2E SLU system. For instance, information associated with the dialog history 108 can be encapsulated as embeddings or vector embeddings, e.g., consolidated in a single vector. In an embodiment, the dialog history 108 need not be text, e.g., the system in an embodiment can directly extract the dialog history embedding from speech without converting it first into text. Briefly BERT (Bidirectional Encoder Representations from Transformers) is a machine learning language model, which can be used for natural language processing (NLP).

In an embodiment, the system and/or method disclosed herein allows for the integration of entire dialog history, not just a previous system prompt. Experiments indicate that performance improves with longer history context. It can handle both dialog human-human conversations and computer-human interactions, given the flexibility of the length of dialog history. In an embodiment, an existing SLU model can be modified to accommodate dialog history via a customization step. In an embodiment, the embedding extractor 104 for dialog history can be a BERT model that has been trained on large amounts of data. The BERT model can also be adapted on the current data and task. The approach (e.g., a system and method) disclosed herein improves the performance of speech-based SLU models, for example, in performing tasks such as dialog action prediction and intent recognition.

In an embodiment, an end-to-end speech based SLU system includes an RNN transducer (RNN-T) based SLU model 106. Another SLU model, such as attention mechanism neural network can be implemented. In an embodiment, one or more RNN-T models are developed by pre-training the models on task independent ASR data. A pre-trained model can then be modified to include semantic labels specific to the SLU task by resizing the output layer and the embedding layer of the prediction network to include additional output nodes. In an embodiment, the ASR in ASR+SLU model 106 can transform speech signals or audio signals (e.g., 102) to word for word transcript, e.g., linguistic text. The SLU in ASR+SLU model 106 can assign meaning to the transcript, e.g., dialog tag and/or intent. The output of the ASR+SLU model 106 can be one or more of dialog act or tag, dialog intent, and text transcript of speech. Such output can be saved as part of dialog history, in an embodiment, for use in the next utterance turn.

The ASR+SLU model or system 106 can be trained in many ways. In one embodiment it can be trained to produce full verbatim transcripts along with SLU labels at the output. SLU entities can then be further extracted from the ASR transcripts as needed. For example, in a travel reservation SLU embodiment, for a speech utterance corresponding to a user prompt, "I want to travel from New York to Chicago on the 12th.", the ASR+SLU model or system 106 can produce the full verbatim transcript along with an SLU intent label <travel-reservation>. The transcripts can be further processed to extract the origin and destination airports.

In another embodiment, the ASR+SLU model or system 106 can be trained to produce SLU labels in the output itself.

In that case, e.g., the output can look like: "I want to travel from New York <origin-airport> to Chicago <destination-airport> on the 12th <travel-date>". The ASR+SLU model or system 106 can also be trained to generate just the SLU entities and their slot values, e.g.: "New York <origin-airport> Chicago <destination-airport>12th <travel-date>".

RNN-T based ASR models are a class of single end-to-end trained, streamable, all-neural models that are adopted for speech recognition. These models can include three different sub-networks: a transcription network, a prediction network, and a joint network. The transcription network produces acoustic embeddings, while the prediction network resembles a language model in that it is conditioned on previous non-blank symbols produced by the model. The joint network combines the two embedding outputs to produce a posterior distribution over the output symbols. This architecture can replace a conventional ASR system composed of separate acoustic model, language model, pronunciation lexicon, and decoder components. RNN-T models can handle more abstract output symbols such as ones marking speaker turns, and these models can be extended for SLU tasks.

For encoding the dialog history 108, the encoder 104 in an embodiment can use BERT as a base model. In an embodiment, the system and method disclosed herein can explore the impact of additional information from the context on the downstream task. BERT is a bidirectional model based on the transformer architecture and is pre-trained on two unsupervised tasks: masked language modeling (MLM) and next sentence prediction (NSP). In an embodiment, the pre-trained BERT model can be fine-tuned on a downstream task, defined as follows. Given a dialog dataset D, an example is denoted as a triplet <c, $u_t$, l>, where c= $\{u_1, u_2, \ldots, u_{t-1}\}$ represents the dialog context with t-1 utterances (u), $u_t$ is the current utterance, and l denotes a label. l supplies the correct intent for an intent recognition task or the set of correct dialog actions for a dialog actions prediction task.

In an embodiment, the system and method can use BERT as a base model for encoding dialog history. Different additional information from the dialog history can be modeled. Using such different additional information, the system can also be used to explore the impact of additional information from the context on the downstream task. In an embodiment, by way of example, the system and method can use the uncased BERT-base model and BertForSequenceClassification operating as a binary classifier as follows. The dialog context c and current utterance $u_t$ are fed together to the BERT (e.g., encoder 104) as a sequence ([CLS] c [SEP] $u_t$ [SEP]) for fine-tuning the model. Different strategies can be explored for encoding additional information from c, such as speaker role identifiers and dialog acts for previous utterances. The impact of such additional information can be investigated on the downstream task. After finetuning, for each utterance $u_t$ at turn t, the system and method use the sequence ([CLS] c [SEP]) as input to the model and use the hidden state of the [CLS] token $c_t^{CLS}$ from the model as the embedding representation of the dialog context c at turn t for the SLU model.

In an embodiment, the system and/or method integrates the dialog history 108 with the E2E SLU model 106. To integrate the embedding from the encoder 104, e.g., BERT based embedding described above, in addition to modifying the output layers of the neural network, the input layers of the neural network can also be adapted. While baseline SLU models are trained on conventional log-mel acoustic features, the E2E SLU model 106 in an embodiment that integrates dialog history has embeddings (e.g., BERT based embeddings) appended to their input acoustic features as well (e.g., as shown at 102, 104 and 106). In an embodiment, to accommodate the increase in the input dimension, the input layer of the transcription network that receives the input features is expanded to include the embedding feature dimensions. In an embodiment, the new network parameters are randomly initialized, while the remaining parts are initialized from the pre-trained ASR network. After these modifications, the model 106 can be trained on SLU data similar to a regular ASR based model.

In an embodiment, the system and method disclosed herein can use dialog history for speech based spoken SLU systems. In an embodiment, the system and method disclosed herein can encode dialog history using a text encoder like BERT. In an embodiment, the system and method disclosed herein can extract and encode dialog history via an encoder like BERT which is trained on custom or application-specific data and task. In an embodiment, the system and method disclosed herein can integrate the dialog history to a speech based SLU system as an input feature. In an embodiment, the system and method disclosed herein can directly extract the dialog history embedding from speech without converting it first into text. In an embodiment, the system and method disclosed herein can integrate the dialog history is part of a customization effort for speech based SLU systems.

The following illustrates example implementation details with use case examples. While specific implementation details are described for illustration purposes, it should be understood that modifications can be made to the illustrated examples, including but not limited to, using different neural network or machine learning architecture or models, hyper-parameters in neural network training, different activation and/or loss functions in neural network training, different spans of dataset, and/or others. The dataset for training can include user interactions, for example, consumer interactions between users and agents, for example, audio data (hours of speech) between different speakers. Transcripts can be provided for each utterance, in addition to annotations for speaker identity, caller intent, dialog actions and emotional valence. In an embodiment, the SLU system disclosed herein can predict caller intent and dialog action, e.g., perform tasks of caller intent and dialog action prediction. In an embodiment, the caller intent task predicts a single intent that represents the customer's goal in the conversation, e.g., an overall intent of the conversation. Each conversation can be labeled with categories of intent. By way of example, for conversations in a particular example application-specific domain, each conversation may be labelled with one of eight categories: order checks, check balance, replace card, reset password, get branch hours, pay bill, schedule appointment, or transfer money. In an embodiment, while the caller intent is an SLU annotation at the conversation level, each utterance in a conversation can be labelled with one or more dialog actions. Continuing with the example application-specific domain, the set of possible dialog actions can be: "yes" response, greeting, response, data confirmation, procedure explanation, data question, closing, data communication, "bear with me" response, acknowledgement, data response, filler disfluency, thanks, open question, problem description, and other.

In an embodiment, before the various encoder, e.g., BERT, and SLU models are constructed, transcripts of the original data are processed to remove non-lexical tokens such as [noise], [laughter] and <unk>. The processed transcripts are then aligned with the audio and significant non-speech regions are marked out. The final data set can include a subset of the hours of speech initially obtained. In an embodiment, this data set can be partitioned into an ASR train, validation and test set based on the same speaker identifiers used for ASR experiments. In an embodiment, the ASR test set can be expanded into full conversations with both agents and callers. In an embodiment, to train the E2E models, additional copies of the corpus can be created using speed/tempo perturbation, thus augmenting the ASR training corpus.

In an embodiment, the encoder 104 for encoding embeddings for SLU 106, can be built by modifying the original BERT architecture by adding a linear layer before the binary classifier (BertForSequenceClassification), to reduce the [CLS] embedding dimension, e.g., to 128. In an embodiment, the reduced dimensionality can be empirically chosen to achieve a balance between the dimensional input speech features (e.g., 240 dimensional input speech features) and the dialog context embedding.

In an embodiment, separate models can be trained for the intent and dialog action classification tasks. By way of example, these models can be trained for 20 epochs using an AdamW optimizer, a batch size of 32 and learning rate set to 2e−5. In an embodiment, and by way of example, sigmoid cross entropy loss can be used or implemented for dialogue act classification, since it is a multi-label binary classification task, and softmax cross entropy loss can be used or implemented for intent classification.

In an embodiment, the impact of dialog history using different strategies to encode additional information, such as speaker role identifiers and dialog actions for previous utterances can be investigated using the trained SLU, which takes such features as inputs. For a new turn t, the additional input features from the dialog context c, where c={$u_1$, $u_2$, ..., $u_{t-1}$} can be:

[SPEAKER]—Additional speaker tokens <user> and <agent> can be used to identify the speaker for each utterance u in the dialog history;

[HISTORY]—The original text of all previous utterances in the dialog history can be used, i.e., {$u_1, u_2, ..., u_{t-1}$};

[DIALOG-ACTS]—The ground-truth dialog actions for utterances in the dialog history can be used for the dialog action classification task, i.e., {$da_1, da_2, ..., da_{t-1}$}.

In an embodiment, the additional speaker tokens (<user>, <agent>) and the unique tokens for dialog actions can be added as special tokens to the BERT Tokenizer vocabulary during training. For each utterance in the data set, a unique history can be constructed in different ways by using the current utterance text and additional information from dialog history, e.g., as follows:

1. [SPEAKER]+[HISTORY]—e.g., the resulting output of which can show the impact of original text from dialog history;
2. [SPEAKER]+[DIALOG-ACTS]—e.g., the resulting output of which can show the impact of dialog acts. Dialog-acts can be used, for example, as a substitute for the original text of an utterance. For example, using these features can also validate if the dialog acts are a good substitute for the original text for an utterance;
3. [SPEAKER]+[HISTORY]+[DIALOG-ACTS]—e.g., the resulting output of which can show the performance when all available additional information is used.

Experiments show that using the additional information from dialog history can improve the performance of the SLU system. In addition, different span of dialog history can be used for embeddings, for example, 2 previous utterances to the current utterance, 4 previous utterances to the current utterance, all previous utterances to the current utterance.

In an embodiment, the SLU system 106 can be an RNN-T based SLU systems with dialog history. As described above, in an embodiment, the RNN-T models developed for SLU can be first pre-trained on task independent ASR data. For example, an ASR model trained on various telephone speech corpora can be used. In an embodiment, the training process can start by training a Connectionist Temporal Classification (CTC) based acoustic model used to initialize the transcription network of the RNN-T models. In an embodiment, by way of a specific example, the pre-trained RNN-T model can have a transcription network which contains 6 bidirectional long short term memory (LSTM) layers with 640 cells per layer per direction.

In an embodiment, by way of a specific example, the prediction network can be a single unidirectional LSTM layer with only 1024 cells. In an embodiment, by way of a specific example, the joint network projects the 1280-dimensional stacked encoder vectors from the last layer of the transcription net and the 1024-dimensional prediction net embedding each to 256 dimensions, combines them multiplicatively, and applies a hyperbolic tangent. In an embodiment, by way of a specific example, the output is projected to 42 logits, corresponding to 41 characters plus BLANK, followed by a softmax. Training setting and design choices can vary and can be configurable. In an embodiment, by way of a specific example, the RNN-T based SLU models can be trained using 40-dimensional, global mean and variance normalized log-Mel filterbank features, extracted every 10 milliseconds (ms). These features can be augmented with $\Delta$ and $\Delta\Delta$ coefficients, every two consecutive frames can be stacked, and every second frame can be skipped, resulting in 240-dimensional vectors every 20 milliseconds (ms).

In an embodiment, by way of a specific example, for performing the dialog act task, the pre-trained RNN-T model can be first modified to accommodate new SLU labels for this task. As described above, during SLU adaptation, new network parameters can be randomly initialized while the remaining parts of the network are copied from the pre-trained network. In an embodiment, by way of a specific example, for the dialog action prediction task, 16 additional nodes can be added. The model can be trained for 20 epochs on the augmented speech data set using an AdamW optimizer and a batch size of 16. Different epochs, optimizer and batch size can be used. In an embodiment, by way of a specific example, the maximum learning rate can be set to 2e−4 and a OneCycleLR policy which include a linear warm-up phase from 5e−5 to 2e−4 over the first 6 epochs followed by a linear annealing phase to 0 for the next 14 epochs, can be employed. Different learning rate and policy can be employed.

The jointly trained ASR+SLU can be run with different kinds of dialog history embeddings, for example, described above. For example, these 128 dimensional BERT embeddings can be used as input features by appending them to the 240 dimensional acoustic features used to train a baseline system (trained without the additional information). The trained model can be run with such additional information as input features, for example, different kinds of embeddings. Experiments demonstrate the benefit of integrating dialog history for the task of dialog act prediction.

In an embodiment, similar to the dialog act task, for the caller intent task or intent prediction, the pre-trained RNN-T model can be modified to accommodate new SLU labels for this task and then trained as described above. In an embodiment, by way of a specific example, extra output nodes (e.g., 8 extra output nodes) can be added to the pre-trained network as intent targets. In an embodiment, by way of a specific example, and as described above, a 128 dimensional history vector can be created for each utterance using the ground truth transcripts or decoded outputs of all preceding utterances. In an embodiment, the embedding vector may use text for creating these BERT embeddings. Similar to the experiments on the dialog act task, it can be observed that the performance of the SLU model 106 integrating additional dialog history embeddings improved over a baseline SLU model constructed with only acoustic features corresponding to the current utterance being processed. For instance, embedding vectors corresponding to each utterance's history can be appended to the input acoustic features to train various SLU models.

In an embodiment, the system and/or method described herein can use different kinds of embeddings (e.g., BERT based embeddings) to capture information available in an utterance's dialog history. The system and/or method can use those embeddings as input features to improve the performance of SLU systems on tasks such as dialog act prediction and caller intent prediction.

The system and/or method disclose herein in various embodiments can provide for end-to-end spoken language understanding (SLU) systems that process human-human or human-computer interactions, integrating dialog history. The system and/or method can more accurately understand the dialog act and/or dialog intent and improve the processing of each conversational turn. For example, while processing a spoken utterance, an RNN transducer (RNN-T) based SLU model has access to its dialog history in the form of decoded transcripts and SLU labels of previous turns. In an embodiment, the system and/or method can encode the dialog history as BERT embeddings, and use them as an additional input to the SLU model along with the speech features for the current utterance. In an embodiment, the system and/or method improves SLU systems in tasks such as dialog action and caller intent recognition tasks, e.g., in comparison to a context independent end-to-end baseline system.

Figure 2:
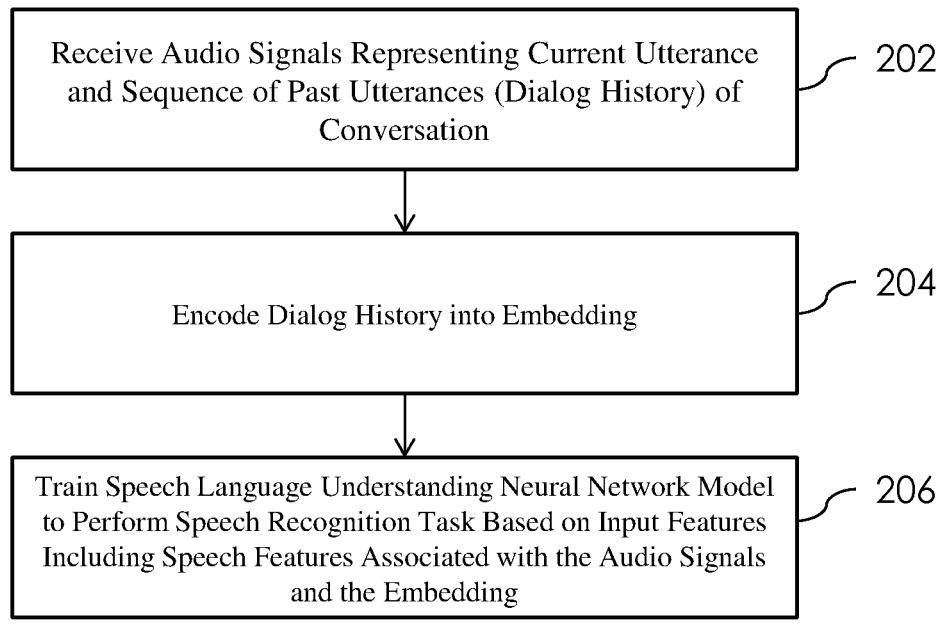
FIG. 2 is a flow diagram illustrating a method for spoken language understanding in an embodiment.

FIG. 2 is a flow diagram illustrating a method for spoken language understanding in an embodiment. The method can be performed by or implemented on one or more computer processors, including at least one hardware processor. At 202, the method can include receiving audio signals, e.g., acoustic signals, representing a current utterance in a conversation and a dialog history including at least information associated with past utterances corresponding to the current utterance in the conversation. The dialog history can include a rich array of information, which can be annotated data and/or speech or text data associated with original past utterances data. Examples of dialog history can include, but are not limited to, text transcripts, dialog actions or acts, speaker roles of the previous utterances in the history, computer or system generated information associated with the past utterances. The transcripts need not be full verbatim transcripts. For example, the transcripts can be full verbatim or include some parts of the original speech of the past utterances. These annotations can be human labeled and/or inferred automatically by a computer or hardware processor. For example, the text of the history can be based on inference (inferred), e.g., with automatic speech recognition (e.g., not human transcripts). Likewise, the dialog action can be inferred by the SLU model for the previous conversation turns. The speaker role can be deduced from operating the dialog system, or for example, by analyzing a recorded conversation, using speaker diarization to automatically assign a speaker to each utterance in the overall speech recording. For example, at least some of the dialog history includes machine inferred information associated with the past utterances. For example, at least some of the dialog history can include output of the spoken language understanding neural network model from a previous turn in the conversation.

At 204, the method can include encoding the dialog history into an embedding. In an embodiment, the dialog history can include text corresponding to the past utterances, and encoding includes encoding the text into an embedding using a text encoder. For example, for utterances in the dialog history, speech can be converted to text and then to an embedding. An example of a text encoder can include, but not limited to, Bidirectional Encoder Representations from Transformers (BERT). Other encoders can be used, for example, like auto-encoders and/or other text encoders.

In another embodiment, the dialog history can be audio signals representing the past utterances. Such audio signals can be directly encoded into an embedding. For instance, the speech that represents past utterances in the dialog history can be directly converted to an embedding, e.g., without an intermediate text representation, e.g., such intermediate speech-to-text conversion which can be skipped. For example, the dialog history embedding can be directly extracted from speech without converting it first into text.

In an embodiment, the encoder such as, but not limited to, Bidirectional Encoder Representations from Transformers (BERT), is trained on application-specific or domain-specific data and task.

In an embodiment, the embedding, which can represent additional information extracted from the dialog history, can include information representing speaker roles associated with the dialog history and original text of the dialog history. In another embodiment, the embedding, which can represent additional information extracted from the dialog history, can include information representing speaker roles associated with the dialog history and dialog actions associated with the past utterances in the dialog history. Dialog actions, also referred to as dialog acts, include a plurality of labels, e.g., predefined for a specific application, domain, and/or task. In yet another embodiment, the embedding, which can represent additional information extracted from the dialog history, can include information representing speaker roles associated with the dialog history, dialog actions associated with the past utterances in the dialog history, and original text of the dialog history. In another embodiment, the embedding, which can represent additional information extracted from the dialog history, can include information representing any one or more or combinations of speaker roles associated with the past utterances of dialog history, dialog actions or acts associated with the past utterances in the dialog history, sentiment associated with the past utterances in the dialog history, automated action performed by the at least one processor associated with processing the dialog history, transcription associated with the past utterances, and original text of the dialog history. The dialog history or the embedding can include other information.

A plurality of such conversation sets (e.g., current utterance and past utterances) can be received, and used as training data to train a machine learning model such as a neural network, e.g., encoder model and/or spoken language understanding model.

At 206, the method can include training a spoken language understanding neural network model to perform a spoken language understanding task based on input features, which include speech features associated with the received audio signals and the embedding. For example, the spoken language understanding neural network model can be trained based on a plurality of audio signals representing current utterances, a plurality of dialog histories respectively associated with the current utterances, and a plurality of encoded embeddings respectively associated with the dialog histories. In an embodiment, the method of spoken language understanding can output intent labels. The method can also output a transcript of the current utterance. The output transcript can be full verbatim transcript of the current utterance. In another embodiment, the output transcript need not be a full verbatim transcript, but include some parts or portions of the current utterance, such as a summary or salient part of the current utterance.

In an embodiment, the spoken language understanding neural network model can be an end-to-end neural network such as, but not limited to, a recurrent neural network (RNN)-T model accommodating spoken language understanding labels. In another embodiment, the spoken language understanding neural network model can be an attention mechanism neural network. Other machine learning or neural network type of model may be implemented for the spoken language understanding neural network model.

In an embodiment, the spoken language understanding task includes predicting a dialog action or dialog act associated with the current utterance. In another embodiment, the spoken language understanding task includes predicting a dialog intent associated with the conversation, e.g., an overall topic or goal associated with the conversation. In yet another embodiment, predicting a dialog action associated with the current utterance and predicting a dialog intent associated with the conversation.

In an embodiment, the spoken language understanding neural network model integrating the dialog history can be part of, and customizes, a speech-based spoken language understanding tool. For example, integrating the dialog history into an SLU can be part of a customization effort for speech-based SLU systems. Via such a technique, an existing speech recognition service can be converted to an SLU service.

In an embodiment, an automated processor, a robot such as a chatbot can run or use the trained spoken language understanding neural network model in carrying out a conversation with a human user, with another processor, robot, or chatbot. The trained spoken language understanding neural network model can also be used for analyzing human-to-human conversations. For example, the trained spoken language understanding neural network model can lead or guide a user such as a customer service agent in conversing or chatting with a customer according to a policy such as a company policy. For example, the spoken language understanding neural network model can be used in autonomously or automatically generating a next conversation utterance based on the spoken language understanding task output by the trained spoken language understanding neural network model. For instance, a processor, robot or chatbot can automatically output speech (e.g., spoken language) corresponding to the generated next conversation utterance for conversing with a user, e.g., conversing or chatting directly with a user.

In another aspect, spoken language understanding neural network model can be run and used to determine whether or not such a conversation (e.g., between a customer service agent and a customer) concluded with a satisfactory resolution. Other uses of the spoken language understanding neural network model can be contemplated.

In an aspect, the system and/or method disclosed herein can use full dialog history for speech-based SLU. The full dialog history can more than just the previous utterance, e.g., all preceding utterances or a window of preceding utterances including more than one previous utterance, relative to the current utterance being processed. In an aspect, a general BERT based text embedding extractor can be used to create a dialog history vector that is used along with the input speech representations. Dialog acts or other related SLU tags can be added in addition to the transcripts of speech in spoken language understanding. For example, in an aspect, the system and/or method disclosed herein can provide for encoding of the full dialog history and other SLU labels using a general BERT based framework for speech-based SLU.

Figure 3:
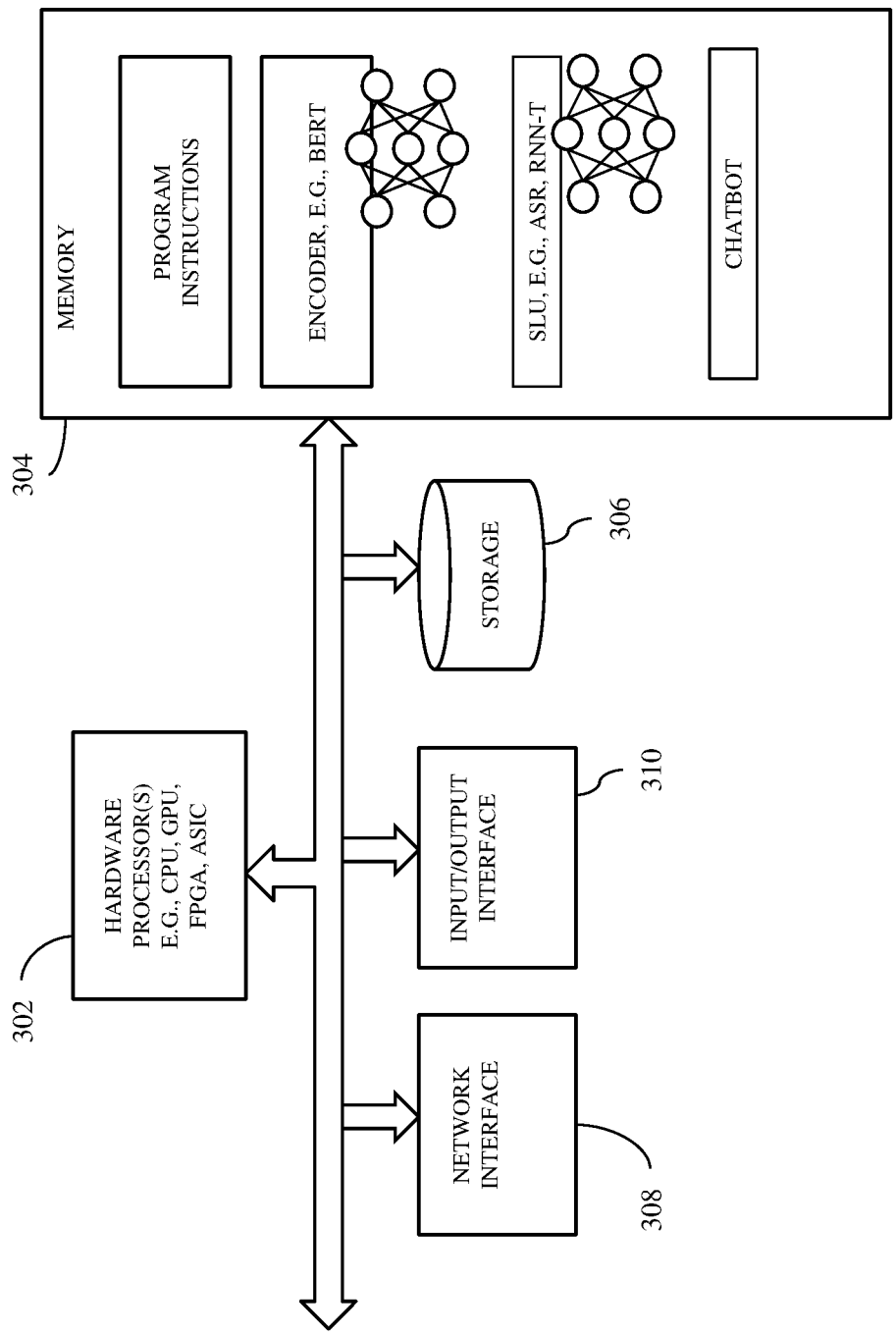
FIG. 3 is a diagram showing components of a system in one embodiment that integrates dialog history in spoken language understanding (SLU) system.

FIG. 3 is a diagram showing components of a system in one embodiment that integrates dialog history in spoken language understanding (SLU) system. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and generate or train an SLU system. A memory device 304 may include random access memory (RAM), read-only memory (ROM) or another memory device, and may store data and/or processor instructions for implementing various functionalities associated with the methods and/or systems described herein. One or more processors 302 may execute computer instructions stored in memory 304 or received from another computer device or medium. A memory device 304 may, for example, store instructions and/or data for functioning of one or more hardware processors 302, and may include an operating system and other program of instructions and/or data. One or more hardware processors 302 may receive input including speech or audio signals representing a current utterance in a conversation and a sequence of past utterances as dialog history in the conversation. For instance, at least one hardware processor 302 may encode the dialog history into one or more embeddings and input the speech or audio signals and the embeddings to an SLU neural network model to train the model to output a spoken language understanding task, such as a dialog act or action prediction and/or dialog intent prediction. In one aspect, such input data may be stored in a storage device 306 or received via a network interface 308 from a remote device, and may be temporarily loaded into a memory device 304 for building or generating the prediction model. The learned prediction model may be stored on a memory device 304, for example, for running by one or more hardware processors 302. One or more hardware processors 302 may be coupled with interface devices such as a network interface 308 for communicating with remote systems, for example, via a network, and an input/output interface 310 for communicating with input and/or output devices such as a keyboard, mouse, display, and/or others.

Figure 4:
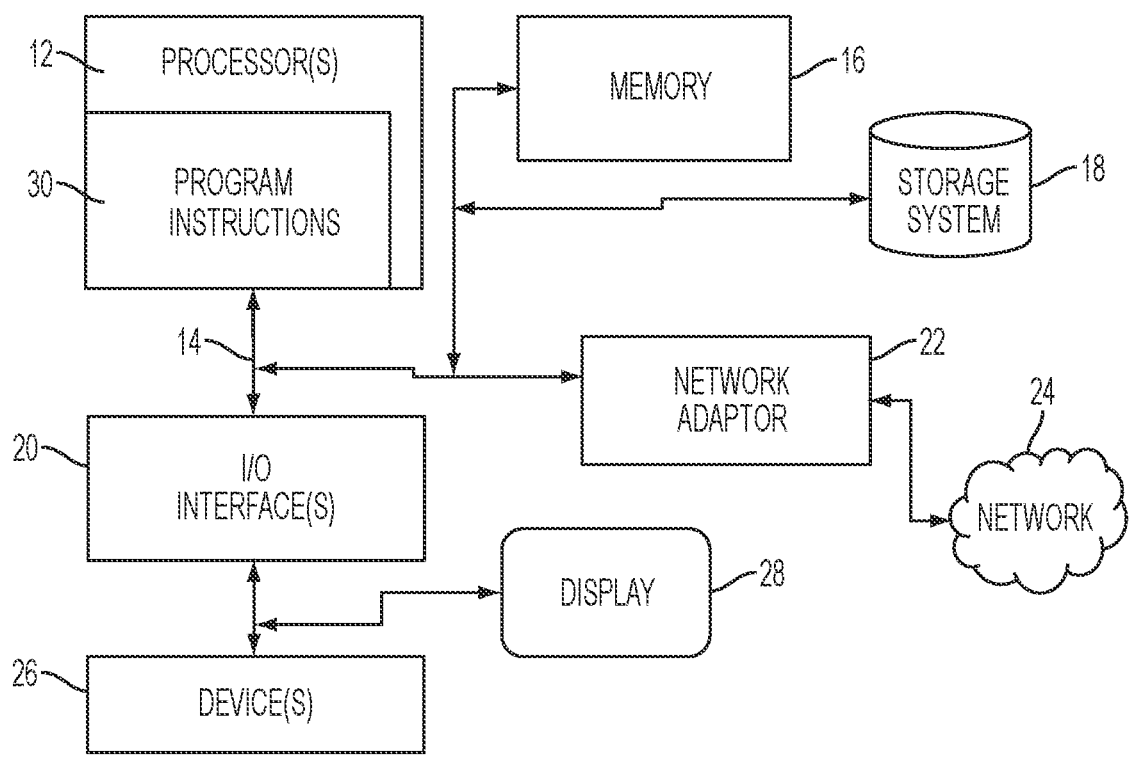
FIG. 4 illustrates a schematic of an example computer or processing system that may implement a system according to one embodiment.

FIG. 4 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
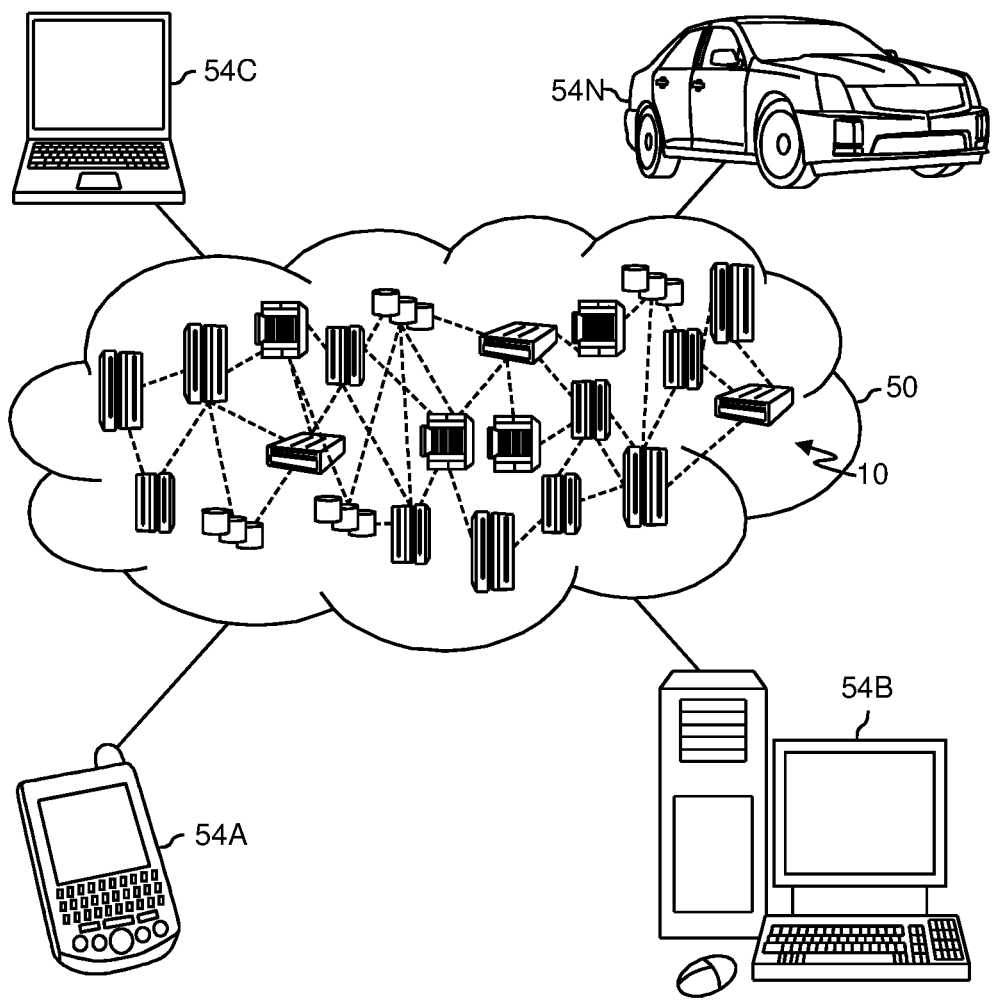
FIG. 5 illustrates a cloud computing environment in one embodiment.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
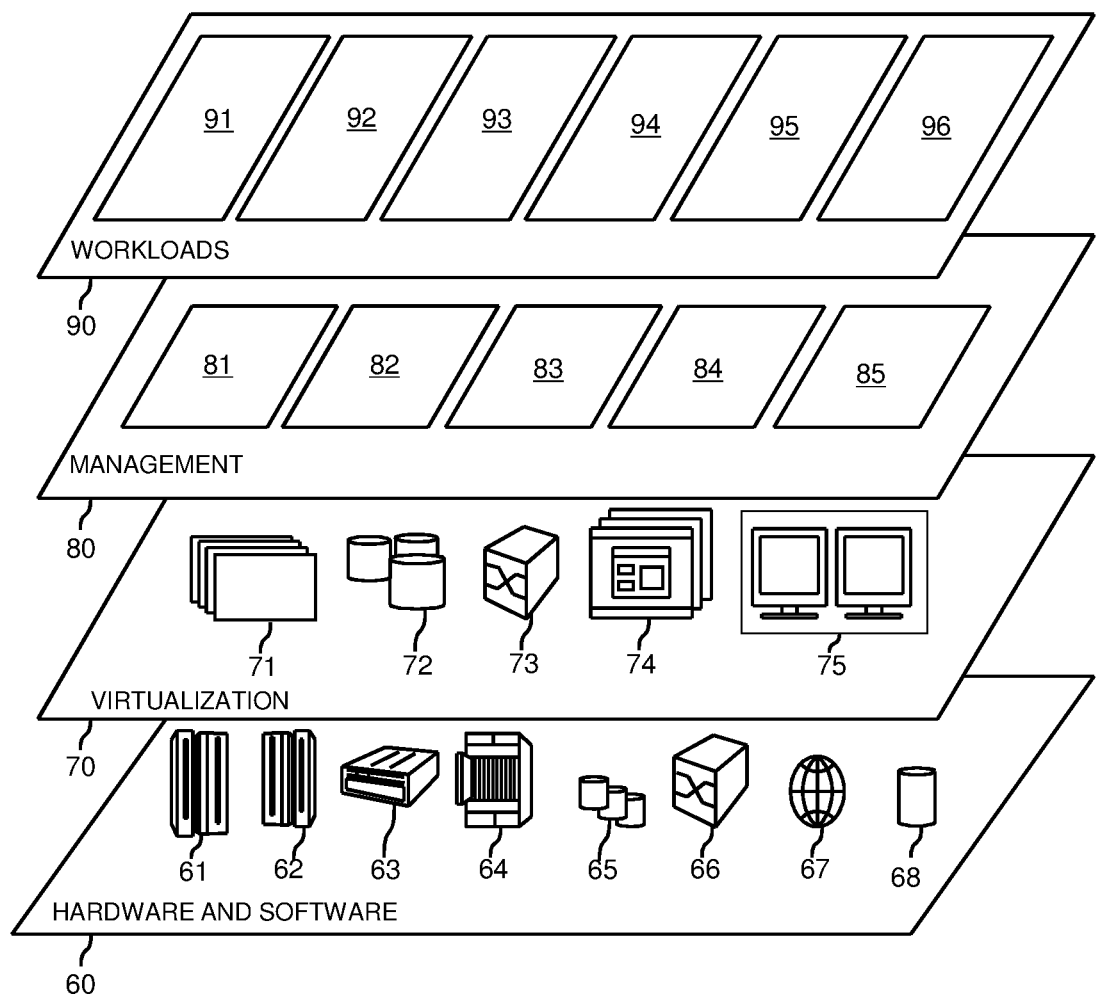
FIG. 6 illustrates a set of functional abstraction layers provided by cloud computing environment in one embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and integration of dialog history in SLU processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   at least one processor; and
   at least one memory device coupled with the processor;
   the at least one processor configured to:
      receive audio signals representing a current utterance in a conversation and a dialog history including at least information associated with past utterances corresponding to the current utterance in the conversation;
      encode the dialog history into an embedding, wherein a span of the dialog history is used in encoding the dialog history;
      generate input features for a spoken language understanding neural network model by appending the embedding of the dialog history to acoustics features of the audio signals; and
      train the spoken language understanding neural network model to perform a spoken language understanding task based on the input features, wherein an input layer of the spoken language understanding neural network model is expanded to receive both the acoustic features of the current utterance and embedding feature dimensions of the embedding representing the dialog history, wherein network parameters associated with expanded part of the input layer are randomly initialized,
      wherein the embedding feature dimensions include at least types of the past utterances classified into dialog action classification tasks, wherein the dialog action classification tasks are classified using a trained multi-label binary classification task model.

2. The system of claim 1, wherein the dialog history includes text, said at least one processor configured to encode the text into the embedding using a text encoder.

3. The system of claim 2, wherein the encoder is trained on application-specific data and task.

4. The system of claim 1, wherein the dialog history includes audio signals, wherein said at least one processor is configured to encode the dialog history into the embedding directly from the audio signals.

5. The system of claim 1, wherein at least some of the dialog history includes machine inferred information associated with the past utterances.

6. The system of claim 1, wherein at least some of the dialog history includes output of the spoken language understanding neural network model from a previous turn in the conversation.

7. The system of claim 1, wherein the embedding includes at least information representing any one or combinations of speaker roles associated with the dialog history, dialog actions associated with the past utterances in the dialog history, sentiment associated with the past utterances in the dialog history, automated action performed by the at least one processor associated with processing the dialog history, and transcription associated with the past utterances.

8. The system of claim 1, wherein said at least one processor is configured to train the spoken language understanding neural network model based on a plurality of audio signals representing current utterances, a plurality of sets of past utterances representing dialog histories associated with the current utterances in the conversation, and a plurality of encoded embeddings associated with the dialog histories.

9. The system of claim 1, wherein the spoken language understanding neural network model includes end-to-end neural network accommodating spoken language understanding labels.

10. The system of claim 1, wherein the spoken language understanding neural network model integrating the dialog history is part of, and customizes, a speech-based spoken language understanding tool.

11. The system of claim 1, wherein the spoken language understanding task includes predicting a dialog action associated with the current utterance.

12. The system of claim 11, wherein said at least one processor is further configured to autonomously generate a next conversation utterance based on the spoken language understanding task output by the trained spoken language understanding neural network model.

13. The system of claim 12, wherein said at least one processor is further configured to output as speech the generated next conversation utterance in conversing with a user.

14. The system of claim 1, wherein the spoken language understanding task includes predicting a dialog intent associated with the conversation.

15. A method for spoken language understanding, comprising:
   receiving audio signals representing a current utterance in a conversation and a dialog history including at least information associated with past utterances corresponding to the current utterance in the conversation;
   encoding the dialog history into an embedding, wherein a span of the dialog history is used in encoding the dialog history;
   generating input features for a spoken language understanding neural network model by appending the embedding of the dialog history to acoustics features of the audio signals; and
   training the spoken language understanding neural network model to perform a spoken language understanding task based on the input features, wherein an input layer of the spoken language understanding neural network model is expanded to receives both acoustic features of the current utterance and embedding feature dimensions of the embedding representing the dialog history, wherein network parameters associated with expanded part of the input layer are randomly initialized,
   wherein the embedding feature dimensions include at least types of the past utterances classified into dialog action classification tasks, wherein the dialog action classification tasks are classified using a trained multi-label binary classification task model.

16. The method of claim 15, wherein the dialog history includes text, and the encoding includes encoding the text into the embedding using a text encoder.

17. The method of claim 16, further including training the encoder on application-specific data and task to encode the dialog history into the embedding.

18. The method of claim 15, wherein at least some of the dialog history includes machine inferred information associated with the past utterances.

19. The method of claim 15, wherein at least some of the dialog history includes output of the spoken language understanding neural network model from a previous utterance turn.

20. A computer program product comprising a non-transitory computer readable storage medium having program instructions embodied therewith, the program instructions readable by a device to cause the device to:
receive audio signals representing a current utterance in a conversation and a dialog history including at least information associated with past utterances corresponding to the current utterance in the conversation;
encode the dialog history into an embedding, wherein a span of the dialog history is used in encoding the dialog history;
generate input features for a spoken language understanding neural network model by appending the embedding of the dialog history to acoustics features of the audio signals; and
train the spoken language understanding neural network model to perform a spoken language understanding task based on the input features, wherein an input layer of the spoken language understanding neural network model is expanded to receives both acoustic features of the current utterance and embedding feature dimensions of the embedding representing the dialog history, wherein network parameters associated with expanded part of the input layer are randomly initialized,
wherein the embedding feature dimensions include at least types of the past utterances classified into dialog action classification tasks, wherein the dialog action classification tasks are classified using a trained multi-label binary classification task model.

\* \* \* \* \*